Patented Feb. 16, 1954

2,669,518

UNITED STATES PATENT OFFICE 2,669,518

METHOD OF TREATING WHOLE EGGS

David Torr, New York, N. Y., assignor to Charles J. Ely, Oakland, N. J.

No Drawing. Application December 19, 1950, Serial No. 201,693

4 Claims. (Cl. 99—113)

This invention relates to the treatment of whole eggs, including the egg shells, for the production of improved products therefrom; and includes a new colloidal whole egg product and an improved process of producing it.

One of the objects of the invention is the utilization of whole eggs, including egg shells, in the production of new egg products.

Another objects of the invention is the production of a colloidal egg product, including egg shells in a colloidal state of subdivision in a matrix which includes all of the other constituents of the egg.

The new egg product of the present invention is a colloidal whole egg product, including the egg shells, and shell membrane, as well as the whites and yolks of the eggs in a homogeneous colloidal state with the egg shells subdivided to a colloidal condition and suspended in a matrix made up of all of the other constituents of the whole egg.

Eggs are commonly utilized by breaking the shell and removing the contents more or less completely, leaving the shells with their lining membrane and more or less adhering egg whites as a waste product.

According to the present invention the egg shells are utilized together with the shell membranes in making a colloidal whole egg product which has a desirable and valuable mineral content contributed by the shells as well as all the other nutritional value of the whole eggs.

According to the present invention the eggs are broken and crushed and roughly ground to convert the egg shells into a finely divided state and the resulting whole egg mixture, including the egg shell and lining membrane and all of the interior contents of the eggs are subjected to further disintegration with progressive reduction in size of the egg shell particles until the whole egg mass is in a colloidal state containing both the organic and inorganic components of the whole egg. As a result of this treatment the egg shells are in such a fine state of subdivision that, even though present to a substantial extent in the colloidal product, they are so blended with the organic matter of the egg that they do not have any of the gritty taste or feel of ordinarily ground egg shells.

Eggs are of a complex structure, including the egg shells, the membrane lining the egg shells, the egg yolk, the egg white, the germs and the inner membranes and strings or chalazae. The shells constitute around 10%, more or less, of the weight of the whole egg. The egg shells, while commonly considered mineral in character, involve a complex structure consisting of a protein substance infiltrated with calcium carbonate and traces of calcium phosphate and magnesium carbonate. The lining membrane of the egg shell is protein in character.

According to the present invention the organic and inorganic matter of the egg shell and also the lining membrane of the shell, as well as the inner membranes, chalazae, etc., are converted, together with the yolk and white of the egg, into a colloidal homogeneous product with the egg shell and membranes, as well as the yolks and whites, etc., in a colloidal homogeneous state. The mineral matter of the egg shell is thus subdivided to a colloidal state with particles less than 10 microns in size and advantageously below 5 microns in size, with a range of e. g., 1 to 10 microns or less. The inner lining membranes of the eggs which are commonly lost when eggs are separated from their shells, are also retained in the colloidal product in a state of colloidal subdivision. The germs, inner membranes, and chalazae as well as the yolks and whites are also converted into a homogeneous colloidal condition.

The invention is of special value for the treatment of uncooked, whole, raw eggs, and when the whole eggs are treated at a temperature below that of cooking of the egg, the resulting product is a colloidal uncooked egg product.

The invention is also applicable to the treatment of hard boiled eggs, to convert the eggs, including the egg shells and shell membrane as well as the cooked egg whites and yolks into a homogeneous colloidal state.

In carrying out the process of the present invention the eggs are first broken up and crushed with a suitable crushing device such as a hammer mill or other crusher to relatively small sizes of egg shell particles and are then further reduced to convert the egg shells into a finer size, and the final disintegration is advantageously carried out in a colloid mill in one or more successive stages with progressively closer setting of the colloid mill until finally the egg shell is reduced to a fineness such that the particles are in general below 10 microns and advantageously below 5 microns, and with a range of e. g. 1 to 10 microns or less. A Premier colloid mill with a shaft and with rotor and stator adjustable as to clearance is advantageously used with a speed of rotation of around 12,000 to 15,000 R. P. M. for a 4" diameter mill and with the surfaces of the rotor and stator of a material such as carborundum, synthetic sapphire, or diamond, which will exert the necessary grinding and shearing of the egg shells to reduce them to the ultimate state of fineness above indicated.

In disintegrating the eggs in such a colloid mill, where the final setting is almost zero clearance, a considerable amount of heat is generated and cooling may be necessary to avoid overheating and cooking of the eggs during disintegration. By sufficient cooling of the mill the final product, if made from raw eggs, is obtained in an uncooked state. By proper regulation of the temperature during disintegration the product may be sterilized or cooked to a greater or less extent by the heat generated in the disintegrating and shearing operation in the closely set colloid mill.

The disintegration of the eggs to produce the colloidal product therefrom is advantageously carried out in an inert atmosphere such as nitrogen or carbon dioxide to protect the material from the air to avoid oxidation. Depending on the final product desired the temperature in the colloid mill may range up to near the boiling point.

During such disintegration of the whole egg product, including the egg shells, more or less hydrolysis may take place with resulting conversion of egg albumin into a partially hydrolyzed condition.

The successive disintegration and hydrolyzing operations result not only in progressive comminution of the shells into finer and finer particle size but also result in a most intimate and homogeneous intermixture of all of the organic constituents of the eggs with the breaking up of the shell membrane, inner membranes, chalazae, germs, etc. and hydrolysis to some extent of the egg protein or albumin to give an ultimate product colloidal in character. All of the egg constituents, including the egg shells, are thoroughly blended with each other in the colloidal product in which the fine colloidal egg shell particles are held in a colloidal matrix of the other egg constituents.

The disintegration, comminuting and hydrolysis of the whole egg product is carried to the point where the egg shell is no longer gritty but is converted into particles of colloidal size, of e. g., 1 to 10 microns or less.

While I have described a colloid mill for completing the disintegration of the whole egg product, a similar product can be obtained by bombardment with gases, as in micronizing equipment.

Where the eggs are cooked before disintegration, the eggs may be heated to a temperature which coagulates the albumin to some extent, and which sterilizes the egg products, and such eggs, such as soft boiled eggs, can then be converted, shells and all, into a colloidal product of a sterile and semi-cooked state.

Where the eggs are hard boiled before disintegration, the colloidal egg product produced by disintegration of the whole eggs will contain the cooked protein and other cooked constituents of the eggs in the form of a colloidal matrix containing the colloidal shell particles and the shell membrane as well as the cooked yolks and whites of the eggs.

Where raw eggs are utilized, without first cooking them, and where the disintegration is carried out with heating of the eggs to a temperature to coagulate the albumin or to cook the eggs, a colloidal partially cooked or wholly cooked egg product is obtained.

The new egg products have the advantage that they contain a desirable and valuable mineral content supplied by the egg shells in a form which is unobjectionable from the standpoint of the use of the eggs for most purposes, together with all of the other constituents of the eggs, including the shell membranes, in a colloidal condition.

It is known that egg yolks have a substantial content of vitamin D and it is known that vitamin D has an activating effect on calcium. The presence of the colloidal egg shell in the new egg product supplies a valuable calcium content, largely in the form of calcium carbonate, together with the vitamin D of the yolk which aids in activating the calcium. Additional vitamin D can advantageously be added to the colloidal egg product to supply an added amount of this vitamin to supplement that contained in the egg yolks for activating the calcium and rendering it more readily assimilable as a mineral food ingredient.

The new colloidal egg products, in an uncooked state, are in the form of a thick, creamy liquid or buttery consistency, with the fat content of the yolks emulsified to an extreme state of subdivision, and with the egg shells also in an extremely fine state of subdivision.

Such a colloidal egg product can be utilized directly as a food product, for example, in making bakery products, in place of ordinary eggs, and will supply a desirable mineral component in the form of the colloidal egg shells, as well as all of the other food constituents of the whole eggs.

The present invention is particularly advantageous for the treatment of whole eggs by themselves. It is also advantageous for the treatment of whole eggs with additional admixed egg shells, or whole eggs with additional admixed eggs from which the shells have been removed, to give products of a colloidal nature and with a content of colloidal egg shell of higher egg shell content or of lower egg shell content than the products produced from the whole eggs without such admixture.

The whole eggs, without admixture, give colloidal products containing around 9 to 10%, more or less, of egg shell in a colloidal state. For some purposes products containing a lower egg shell content are desirable. Such products can readily be produced by removing the shells from part of the eggs and admixing such eggs with whole eggs with their shells so that the resulting product contains a lower mineral content than the product from the whole eggs by themselves. Thus, by removing the shells from approximately half the eggs and using the other half of the eggs, shells and all, a product is obtained containing, e. g., around 5% or somewhat more of colloidal egg shell mineral. By varying the proportion of shelled eggs and eggs used with their shells, colloidal egg products can be obtained containing as low as 1% or somewhat less of colloidal egg shell product and controlled amounts of egg shell in colloidal form varying from around 1% to around 7 or 8% of colloidal egg shell. If, for example, colloidal egg shell products are desired containing 2 or 3 or 5% of colloidal egg shell in the product such products can readily be made by varying the proportions of shelled eggs and of whole eggs subjected to the colloidal disintegration treatment.

So also, products of higher mineral content can be obtained by removing the shells from part of the eggs and adding the shells to whole eggs so that the content of colloidal egg shell mineral in the colloidal product will be larger than the normal egg shell content of whole eggs. If half of the eggs are removed from their shells and the shells are added to the other half of the eggs from which the shells are not removed, the mineral content of the resulting colloidal egg product will be around 20% or somewhat more of the total weight of the colloidal product. Colloidal egg products containing up to 50% or more of egg shell in colloidal form can thus be produced in the form of a mineral concentrate which can be used for admixture with other food products to supply a desirable mineral component.

Where the egg shells are removed from the eggs these egg shells themselves may be separately utilized and converted into a colloidal product. In this case there should be added to or admixed with the fresh egg shells sufficient liquid to enable the shells to be disintegrated to a colloidal state and to produce a colloidal product containing the fine egg shell particles uniformly dispersed in a liquid medium. The whites of the eggs can thus be admixed with the fresh egg shells, or the yolks of eggs may be admixed with the fresh egg shells, e. g., in amounts varying from 10 to 50% of the weight of the shells, and subjected to disintegration to convert the products into a colloidal state with the fine colloidal egg shell particles in suspension in a matrix made up essentially of egg whites or made up essentially of egg yolks.

The separated egg shells in a fresh state can also be admixed with other liquid such as water or edible oils or other food constituents to give colloidal egg shell products having varying contents of egg shell in a small percentage, around 1 to 5%, up to a high percentage, of e. g., 50 to 75%.

The new colloidal egg products can be frozen to give a solid, homogeneous, frozen egg product and can be stored and shipped in this state. Such products may contain the normal egg shell content of the whole eggs or a greater or smaller percentage of egg shells in a colloidal state.

The new colloidal egg products can also be dried, by spray drying or otherwise, to give dried egg products containing the colloidal egg shell particles as well as other egg constituents in the form of a homogeneous product. Where the whole egg product, without admixed egg or shell constituents, is thus used the dried products will contain a high content of colloidal egg shell particles based on the total dry weight of the product. The proportions of fat, protein, and shell vary somewhat but a dried product may represent e. g. around 30% of the total weight of the egg, after removing around 70% or somewhat less of water. In the dried product the fat, protein and egg shell are in roughly equal proportions, so that a dried whole egg product will contain around one-third or somewhat less of colloidal egg shell uniformly distributed in the dried product which also contains the egg protein and fat and other constituents. Such dried egg products can be reconstituted with water to form a product similar to the undried egg product.

The mineral content of the new colloidal egg products may be greater than is desirable where the eggs are to be utilized directly as a food product; but when the colloidal egg product is utilized in bakery products or admixed with other food ingredients, a desirable and valuable mineral content is supplied as well as the other constituents of the whole eggs. Thus the new colloidal egg product can be utilized to advantage in making salad dressings, confectionery, spaghetti, noodles, spreads for bread, etc. The dried colloidal egg product can advantageously be used, e. g., in dry cake, bread and other bakery mixes. Where the eggs are partially or completely cooked, e. g., boiled before converting them into the colloidal state, the resulting colloidal products can advantageously be used in making salad dressings, bread spreads and other food products where the egg shell supplies a desirable mineral content in addition to the normal food values of the egg.

Instead of subjecting the colloidal egg products without admixture to the disintegrating process to produce the colloidal egg products therefrom, there may be admixed with the broken eggs and incorporated into the colloidal product protective colloids or other substances such as gelatin, glucose, dextrin, lactose or glycerin. Other food constituents such as oils, sugar, flour, starches, flavoring and preserving agents, etc. can also be incorporated with the broken up whole eggs before converting them into the colloidal state so that a composite egg product will be obtained in which the whole eggs, including the egg shells, are blended with other food products in the form of a homogeneous colloidal product.

The new colloidal egg products are valuable food products and adjuncts for use as food products, supplying a desirable content of mineral calcium in a particularly advantageous state together with the valuable vitamin D content of the egg yolks.

It is well recognized that there is a deficiency of calcium in the human diet. This calcium deficiency is overcome by the new colloidal egg products which supply a substantial content of calcium in a particularly valuable form, sufficient to supply the calcium deficiency when the eggs are used together with other food constituents in a diet which is normally deficient in calcium.

Because the amount of calcium contained in the egg shells may be greater than is desirable where the new colloidal egg product is used as such as a food, this colloidal egg product is a valuable supplement, particularly for calcium deficient diets, and for admixture with other foods which are deficient in calcium. One illustration of this is the use of the new colloidal egg products in the baking of cakes, bread and other bakery products where the entire baked products are supplied with a valuable mineral supplement in the form of the colloidal egg shell calcium compounds.

I claim:

1. The method of treating whole eggs, including egg shells, which comprises progressively disintegrating the whole eggs, and continuing the progressive disintegration until the entire product, including the egg shell and shell membrane, is converted into a colloidal mass with the egg shell constituents having a particle size of less than about 10 microns uniformly dispersed in a colloidal organic matrix.

2. The process according to claim 1 in which the eggs treated are raw eggs and the disintegra- carried out at a temperature which produces a colloidal raw egg product.

3. The process according to claim 1 in which the eggs treated are raw egs and the disintegration is carried out with heating of the material to produce a colloidal cooked egg product.

4. The process according to claim 1 in which cooked eggs are disintegrated to give a colloidal cooked egg product.

DAVID TORR.

References Cited in the file of this patent

"Food Research," July-August 1947, pages 288–289, article entitled "Addition of Ground Egg Shell to Dried Egg for Use in Cooking."